(12) United States Patent
Shiraki et al.

(10) Patent No.: US 8,346,003 B2
(45) Date of Patent: Jan. 1, 2013

(54) IMAGE PROCESSING FOR REDUCING BLUR

(75) Inventors: Hisakazu Shiraki, Kanagawa (JP); Tetsujiro Kondo, Tokyo (JP); Kenji Takahashi, Kanagawa (JP); Tsutomu Watanabe, Kanagawa (JP); Takahiro Nagano, Kanagawa (JP); Yasuhiro Suto, Tokyo (JP); Noriaki Takahashi, Tokyo (JP)

(73) Assignee: Sony Corporation, Tokyo (JP)

( * ) Notice: Subject to any disclaimer, the term of this patent is extended or adjusted under 35 U.S.C. 154(b) by 1072 days.

(21) Appl. No.: 12/277,591

(22) Filed: Nov. 25, 2008

(65) Prior Publication Data

US 2009/0161976 A1    Jun. 25, 2009

(30) Foreign Application Priority Data

Dec. 21, 2007  (JP) ................................ 2007-330455

(51) Int. Cl.
*G06K 9/40* (2006.01)
*G06K 9/62* (2006.01)
(52) U.S. Cl. ....................... 382/254; 382/155
(58) Field of Classification Search .................. 382/254, 382/155
See application file for complete search history.

(56) References Cited

U.S. PATENT DOCUMENTS

| | | | |
|---|---|---|---|
| 6,678,405 B1* | 1/2004 | Kondo et al. | 382/159 |
| 7,149,262 B1* | 12/2006 | Nayar et al. | 375/341 |
| 7,587,099 B2* | 9/2009 | Szeliski et al. | 382/275 |
| 2003/0035594 A1* | 2/2003 | Kondo et al. | 382/298 |
| 2003/0133039 A1 | 7/2003 | Kondo et al. | |
| 2004/0019717 A1* | 1/2004 | Kondo et al. | 710/100 |
| 2004/0062450 A1* | 4/2004 | Kondo et al. | 382/266 |
| 2005/0111749 A1* | 5/2005 | Kondo | 382/261 |
| 2005/0190296 A1* | 9/2005 | Kondo et al. | 348/565 |
| 2005/0276404 A1* | 12/2005 | Bull et al. | 379/142.08 |
| 2006/0087692 A1* | 4/2006 | Chang | 358/3.01 |
| 2007/0177817 A1* | 8/2007 | Szeliski et al. | 382/275 |
| 2009/0161948 A1* | 6/2009 | Takahashi et al. | 382/160 |

FOREIGN PATENT DOCUMENTS

| | | | |
|---|---|---|---|
| JP | 11027564 A | * | 1/1999 |
| JP | 2001-222702 | | 8/2001 |
| JP | 2002-218414 | | 8/2002 |
| JP | 2005-142743 | | 6/2005 |

OTHER PUBLICATIONS

U.S. Appl. No. 12/326,413, filed Dec. 2, 2008, Suto, et al.
U.S. Appl. No. 12/327,980, filed Dec. 4, 2008, Nagano, et al.
Office Action issued Dec. 27, 2011 in Japanese Patent Application No. 2007-330455.

* cited by examiner

*Primary Examiner* — Wenpeng Chen
(74) *Attorney, Agent, or Firm* — Oblon, Spivak, McClelland, Maier & Neustadt, L.L.P.

(57) ABSTRACT

An image processing device for converting an input image into an output image whose blur is reduced. The image processing device includes a first image extracting section that extracts a plurality of pixels composed of a pixel of the input image corresponding to a pixel of interest in the output image and predetermined pixels surrounding the pixel of the input image. A first feature quantity calculating section calculates a first feature quantity from the plurality of pixels extracted by the first image extracting section. A second pixel extracting section extracts a plurality of pixels composed of the pixel of interest and predetermined pixels surrounding the pixel of interest from the input image. A predicting section then generates a pixel value of the pixel of interest.

11 Claims, 12 Drawing Sheets

PIXEL CORRESPONDING TO PIXEL OF INTEREST

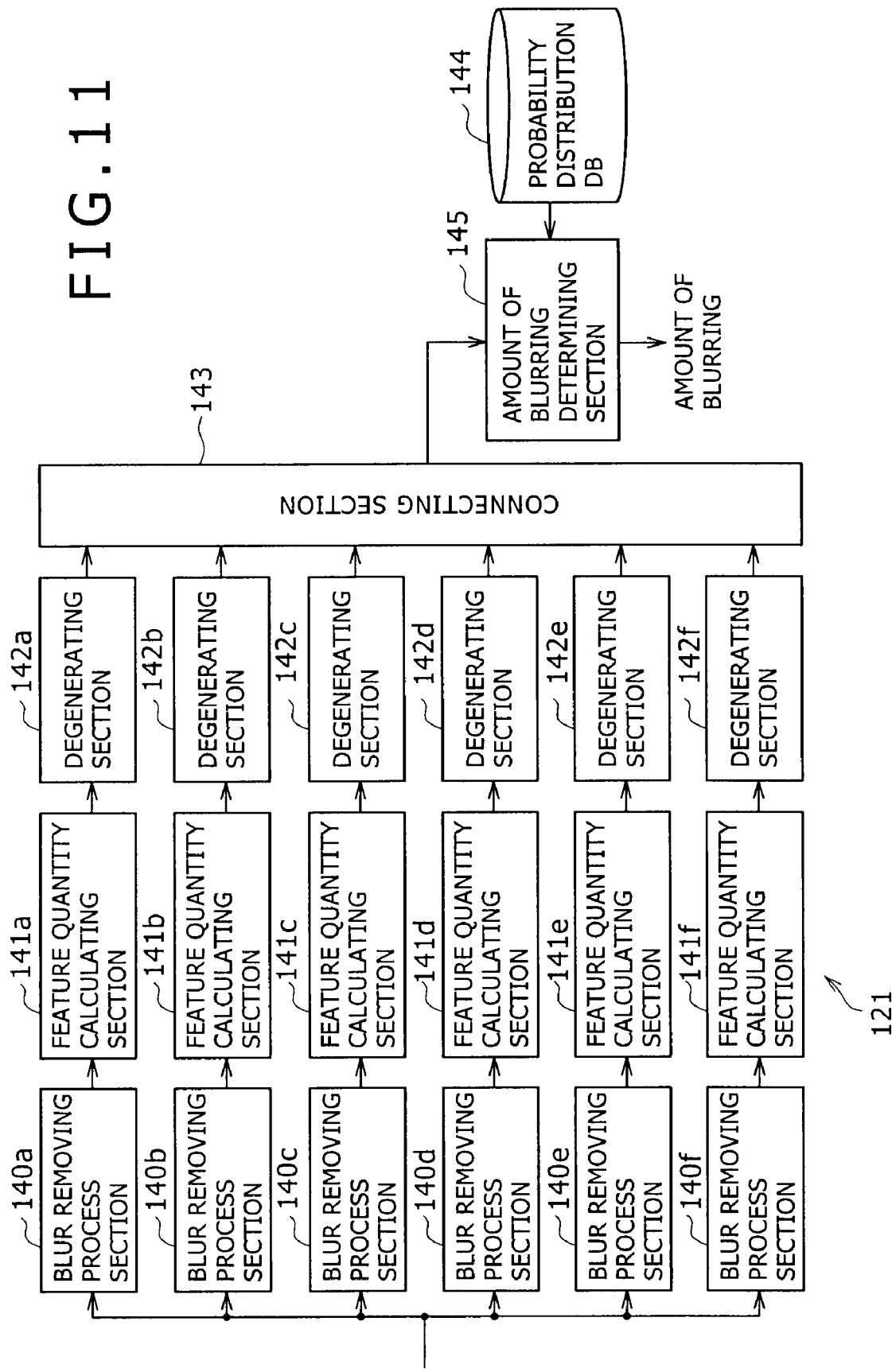

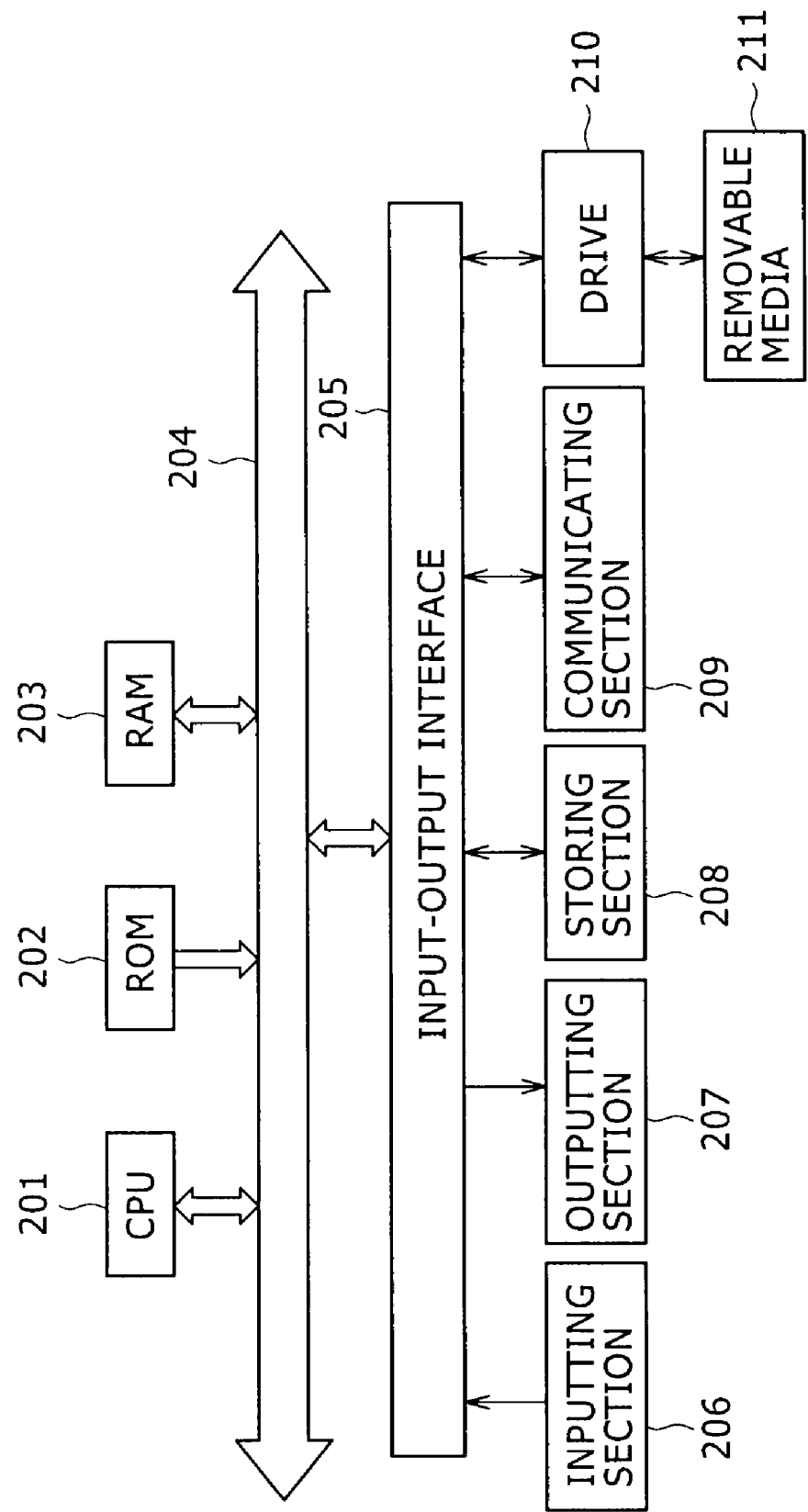

IMAGE PROCESSING FOR REDUCING BLUR

CROSS REFERENCES TO RELATED APPLICATIONS

The present invention contains subject matter related to Japanese Patent Application JP 2007-330455 filed in the Japan Patent Office on Dec. 21, 2007, the entire contents of which being incorporated herein by reference.

BACKGROUND OF THE INVENTION

1. Field of the Invention

The present invention relates to an image processing device, an image processing method, a program, and a learning device, and particularly to an image processing device, an image processing method, a program, and a learning device that can optimally remove a blur that occurs when a plurality of subjects whose focal lengths differ from each other are included in an image.

2. Description of the Related Art

The present applicant has proposed a method that, for example, varies a processing coefficient generated according to a parameter adjusted by a user and which performs image conversion in an image converting process for converting an image with an out-of-focus blur or a motion blur or low-resolution image data into unblurred or high-resolution image data by mapping using the predetermined processing coefficient (see Japanese Patent Laid-Open No. 2002-218414 (hereinafter referred to as Patent document 1), for example).

However, the method proposed in Patent document 1 gives the parameter to an entire screen uniformly. For example, in a case of removing a blur of an image in which an in-focus region and an out-of-focus region are present in one screen because a plurality of subjects whose focal lengths differ from each other are included in the image, when an optimum parameter is set for pixels in the out-of-focus region, a similar blur removing process is also performed on the in-focus region, and thus a blur occurs in the in-focus region instead. That is, an optimum processing coefficient may not be generated for each pixel, and thus an image whose blur is removed on the entire screen may not be generated.

In addition, the present applicant has proposed preparing a conversion table to be converted into a coefficient generating parameter such as resolution, perceived noise and the like in advance according to a feature quantity in the above-described image converting process and generating a processing coefficient on the basis of the coefficient generating parameter (see Japanese Patent Laid-Open No. 2005-142743 (hereinafter referred to as Patent Document 2), for example).

SUMMARY OF THE INVENTION

In Patent Document 2, however, correspondence between the feature quantity and the coefficient generating parameter is based on subjectivity, and therefore optimization of an image after the conversion is not necessarily ensured.

The present invention has been made in view of such a situation. It is desirable to optimally remove a blur that occurs when a plurality of subjects whose focal lengths differ from each other are included in an image.

According to a first embodiment of the present invention, there is provided an image processing device for converting an input image into an output image whose blur is reduced more. The image processing device includes: first image extracting means for extracting a plurality of pixels composed of a pixel of the input image which pixel corresponds to a pixel of interest as a pixel to which to direct attention within the output image and predetermined pixels surrounding the pixel of the input image; first feature quantity calculating means for calculating a first feature quantity from the plurality of pixels extracted by the first image extracting means; processing coefficient generating means for obtaining a second processing coefficient by operation on the first feature quantity and a first processing coefficient, the second processing coefficient being generated by operation on the first feature quantity and the first processing coefficient learned in advance from a normal equation based on a relational equation for generating an unblurred teacher image by operation on the second processing coefficient and blurred images to which blurs of a plurality of kinds of amounts of blurring are added as student images; second pixel extracting means for extracting a plurality of pixels composed of the pixel corresponding to the pixel of interest and predetermined pixels surrounding the pixel corresponding to the pixel of interest from the input image; and predicting means for generating a pixel value of the pixel of interest by operation on the plurality of pixels extracted by the second pixel extracting means and the second processing coefficient.

The first feature quantity can be a nonlinear feature quantity.

The image processing device can further include: blur removing process means for generating a plurality of kinds of blur removal result images by adding blurs of a plurality of kinds of amounts of blurring to the student images and subjecting the student images to a blur removing process by a plurality of blur removal coefficients for removing the blurs of the plurality of kinds of amounts of blurring respectively; second feature quantity calculating means for calculating a second feature quantity from the plurality of kinds of blur removal result images; and nonlinear feature quantity determining means for determining the nonlinear feature quantity as the first feature quantity using the second feature quantity of each of the plurality of kinds of blur removal result images.

The image processing device further includes class classifying means for classifying the pixel of interest into a predetermined class according to pixel values of the pixel of the input image which pixel corresponds to the pixel of interest and predetermined pixels surrounding the pixel of the input image, wherein the coefficient generating means can generate the normal equation for each class.

According to a first embodiment of the present invention, there is provided an image processing method for converting an input image into an output image whose blur is reduced more. The image processing method includes the steps of: extracting a plurality of pixels composed of a pixel of the input image which pixel corresponds to a pixel of interest as a pixel to which to direct attention within the output image and predetermined pixels surrounding the pixel of the input image; calculating a feature quantity from the plurality of pixels extracted; obtaining a second processing coefficient by operation on the feature quantity and a first processing coefficient, the second processing coefficient being generated by operation on the feature quantity and the first processing coefficient learned in advance from a normal equation based on a relational equation for generating an unblurred teacher image by operation on the second processing coefficient and blurred images to which blurs of a plurality of kinds of amounts of blurring are added as student images; further extracting a plurality of pixels composed of the pixel corresponding to the pixel of interest and predetermined pixels surrounding the pixel corresponding to the pixel of interest from the input image; and generating a pixel value of the pixel of interest by operation on the plurality of pixels further extracted and the second processing coefficient.

According to a first embodiment of the present invention, there is provided a program for making a computer perform image processing for converting an input image into an output image whose blur is reduced more. The image processing includes the steps of: extracting a plurality of pixels composed of a pixel of the input image which pixel corresponds to a pixel of interest as a pixel to which to direct attention within the output image and predetermined pixels surrounding the pixel of the input image; calculating a feature quantity from the plurality of pixels extracted; obtaining a second processing coefficient by operation on the feature quantity and a first processing coefficient, the second processing coefficient being generated by operation on the feature quantity and the first processing coefficient learned in advance from a normal equation based on a relational equation for generating an unblurred teacher image by operation on the second processing coefficient and blurred images to which blurs of a plurality of kinds of amounts of blurring are added as student images; further extracting a plurality of pixels composed of the pixel corresponding to the pixel of interest and predetermined pixels surrounding the pixel corresponding to the pixel of interest from the input image; and generating a pixel value of the pixel of interest by operation on the plurality of pixels further extracted and the second processing coefficient.

In the first embodiment of the present invention, a plurality of pixels composed of a pixel of the input image which pixel corresponds to a pixel of interest as a pixel to which to direct attention within the output image and predetermined pixels surrounding the pixel of the input image are extracted, a feature quantity is calculated, a second processing coefficient is obtained by operation on the feature quantity and a first processing coefficient, the second processing coefficient being generated by operation on the calculated feature quantity and the first processing coefficient learned in advance from a normal equation based on a relational equation for generating an unblurred teacher image by operation on the second processing coefficient and blurred images to which blurs of a plurality of kinds of amounts of blurring are added as student images, a plurality of pixels composed of the pixel corresponding to the pixel of interest and predetermined pixels surrounding the pixel corresponding to the pixel of interest are further extracted from the input image, and a pixel value of the pixel of interest is generated by operation on the plurality of pixels further extracted and the second processing coefficient.

According to a second embodiment of the present invention, there is provided a learning device including: normal equation generating means for obtaining a second processing coefficient by operation on a feature quantity and a first processing coefficient obtained from a plurality of kinds of blurred images as student images formed by adding blurs of a plurality of kinds of amounts of blurring to an input image, and generating a normal equation using pixel values of the blurred images as the student images and pixel values of the input image as a teacher image to solve a relational equation for generating the input image as unblurred teacher image by operation on the second processing coefficient and the student images; and coefficient generating means for generating the first processing coefficient by solving the normal equation.

The feature quantity can be a nonlinear feature quantity.

The learning device can further include: blur removing process means for generating a plurality of kinds of blur removal result images by adding blurs of a plurality of kinds of amounts of blurring to the student images and subjecting the student images to a blur removing process by a plurality of blur removal coefficients for removing the blurs of the plurality of kinds of amounts of blurring respectively; feature quantity detecting means for detecting a feature quantity from the plurality of kinds of blur removal result images; and nonlinear feature quantity determining means for determining the nonlinear feature quantity using the feature quantity of each of the plurality of kinds of blur removal result images.

The learning device further includes class classifying means for classifying a pixel of interest into a predetermined class according to pixel values of a pixel of the student images which pixel corresponds to the pixel of interest and predetermined pixels surrounding the pixel corresponding to the pixel of interest, wherein the coefficient generating means can generate the normal equation for each class.

In the second embodiment of the present invention, a second processing coefficient is obtained by operation on a feature quantity and a first processing coefficient obtained from a plurality of kinds of blurred images as student images formed by adding blurs of a plurality of kinds of amounts of blurring to an input image, a normal equation is generated using pixel values of the blurred images as the student images and pixel values of the input image as a teacher image to solve a relational equation for generating the input image as unblurred teacher image by operation on the second processing coefficient and the student images, and the first processing coefficient is generated by solving the normal equation.

According to the first embodiment of the present invention, it is possible to optimally remove a blur that occurs when a plurality of subjects whose focal lengths differ from each other are included in an image.

According to the second embodiment of the present invention, it is possible to obtain the first processing coefficient to be used in an image processing device that optimally removes a blur that occurs when a plurality of subjects whose focal lengths differ from each other are included in an image.

BRIEF DESCRIPTION OF THE DRAWINGS

FIG. 11 is a block diagram showing an example of detailed configuration of a feature quantity extracting section in FIG. 10; and FIG. 12 is a block diagram showing an example of configuration of an embodiment of a computer to which an embodiment of the present invention is applied.

DETAILED DESCRIPTION OF THE PREFERRED EMBODIMENTS

Figure 1:
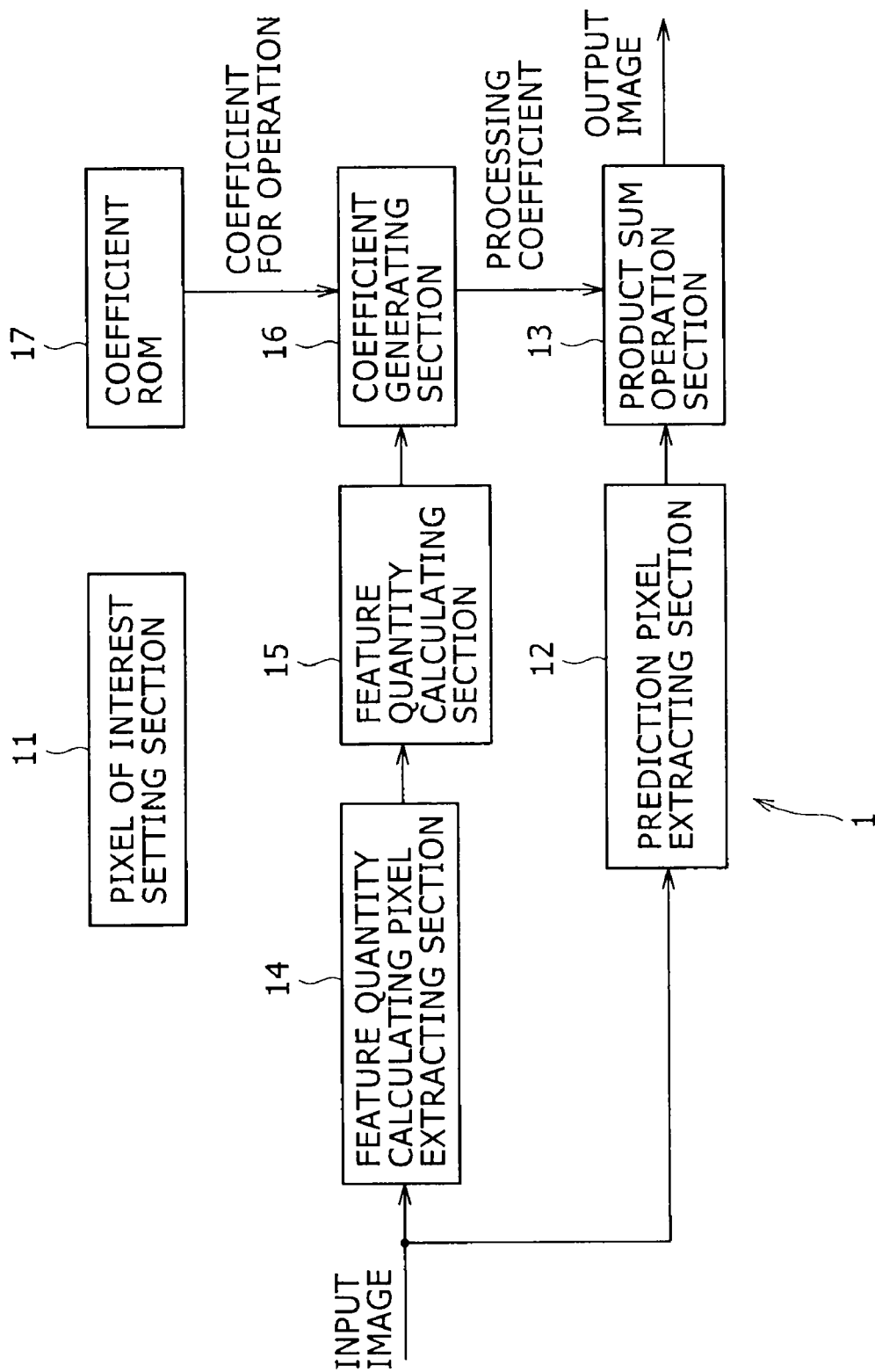
FIG. 1 is a block diagram showing an example of configuration of a first embodiment of an image processing device to which an embodiment of the present invention is applied.

FIG. 1 shows an example of configuration of a first embodiment of an image processing device to which an embodiment of the present invention is applied.

The image processing device 1 of FIG. 1 includes a pixel of interest setting section 11, a prediction pixel extracting section 12, a product sum operation section 13, a feature quantity calculating pixel extracting section 14, a feature quantity calculating section 15, a coefficient generating section 16, and a coefficient ROM 17.

The image processing device 1 is supplied with an image having a plurality of object regions whose amounts of blurring differ depending on a distance between a subject and a camera as an input image. The image processing device 1 properly processes each of a blurred part and an unblurred part of the input image. The image processing device 1 thereby outputs an image from which the blurring of the input image is removed as a whole as an output image.

The pixel of interest setting section 11 sets each pixel forming the output image as a pixel of interest in order.

Figure 2:
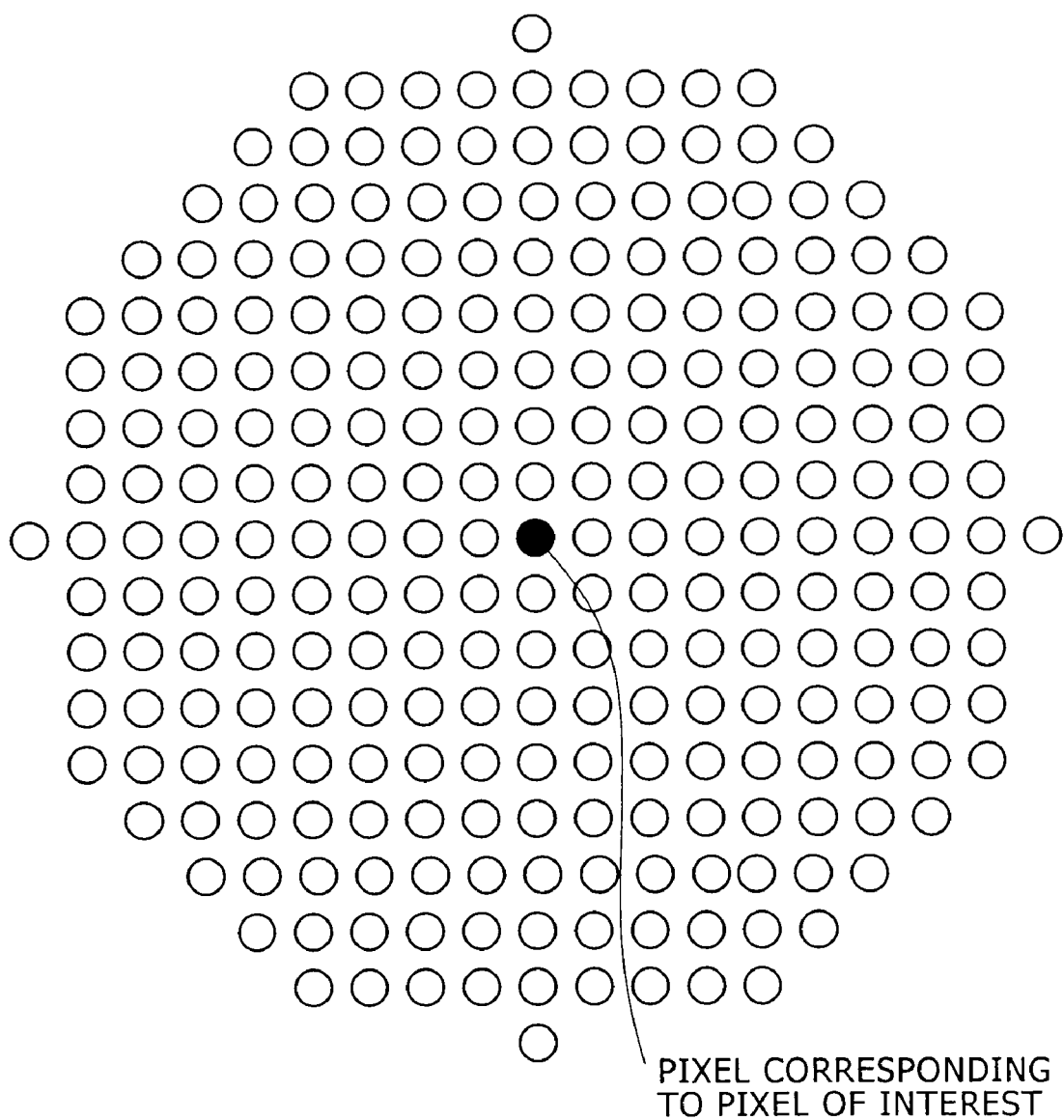
FIG. 2 is a diagram showing an example of a prediction tap.

The prediction pixel extracting section 12 extracts pixels (pixel values of the pixels) within a predetermined region of the input image as pixels to be used for prediction of the pixel of interest. The pixels extracted in the prediction pixel extracting section 12 will hereinafter be referred to as a "prediction tap." An optimum shape (extracted area) of the prediction tap depends on an assumed state of degradation (degradation model) of the input image, such as a motion blur, an out-of-focus blur, or the like. However, as in the present embodiment, when an out-of-focus blur due to a defocused state of a lens is assumed, pixels within a circular region with a pixel corresponding to the pixel of interest as a center in the input image as shown in FIG. 2, for example, are extracted as a prediction tap.

The product sum operation section 13 obtains the pixel value of the pixel of interest by a product sum operation on the pixel values of the prediction tap supplied from the prediction pixel extracting section 12 and processing coefficients corresponding to the prediction tap supplied from the coefficient generating section 16. The product sum operation section 13 then outputs the pixel value of the pixel of interest.

Letting $x_1$ to $x_N$ be the pixel values of the pixels forming the prediction tap, and letting $w_1$ to $w_N$ be the processing coefficients corresponding to the pixel values $x_1$ to $x_N$, the product sum operation for obtaining the pixel value z of the pixel of interest can be expressed by the following Equation (1).

$$z = w_1 x_1 + w_2 x_2 + \ldots + w_N x_N \quad (1)$$

Equation (1) can be written as Equation (2) when expressed by a pixel value vector X having the pixel values $x_1$ to $x_N$ as components and a processing coefficient vector W having the processing coefficients $w_1$ to $w_N$ as components.

$$z = W \cdot X \quad (2)$$

The feature quantity calculating pixel extracting section 14 extracts pixels for calculating the feature quantity of the pixel of interest from the input image. The feature quantity calculating pixel extracting section 14 then supplies the pixels to the feature quantity calculating section 15. Specifically, the feature quantity calculating pixel extracting section 14 extracts a pixel of the input image which pixel corresponds to the pixel of interest and predetermined pixels in the vicinity of the pixel corresponding to the pixel of interest as pixels for calculating the feature quantity of the pixel of interest. The feature quantity calculating pixel extracting section 14 then supplies the pixels to the feature quantity calculating section 15.

The feature quantity calculating section 15 calculates the feature quantity of the pixel of interest using the pixels (pixel values of the pixels) supplied from the feature quantity calculating pixel extracting section 14. In this case, letting (x, y) be the coordinate value of the pixel of interest, and p(x, y) be the feature quantity of the pixel of interest, a first-order differential feature quantity expressed by Equation (3), (4), or (5) between the pixel of interest and a pixel distant by an $i_d$ pixel from the pixel of interest in a horizontal direction (x-direction), a vertical direction (y-direction), or an oblique direction, or a second-order differential feature quantity expressed by Equation (6), (7), or (8), for example, can be adopted as the feature quantity p(x, y) of the pixel of interest (x, y).

$$p(x, y) = |X(x, y) - X(x + i_d, y)| \quad (3)$$

$$p(x, y) = |X(x, y) - X(x, y + i_d)| \quad (4)$$

$$p(x, y) = |X(x, y) - X(x + i_d, y + i_d)| \quad (5)$$

$$p(x, y) = |2 \times X(x, y) - X(x + i_d, y) - X(x - i_d, y)| \quad (6)$$

$$p(x, y) = |2 \times X(x, y) - X(x, y + i_d) - X(x, y - i_d)| \quad (7)$$

$$p(x, y) = |2 \times X(x, y) - X(x + i_d, y + i_d) - X(x - i_d, y - i_d)| \quad (8)$$

Figure 3:
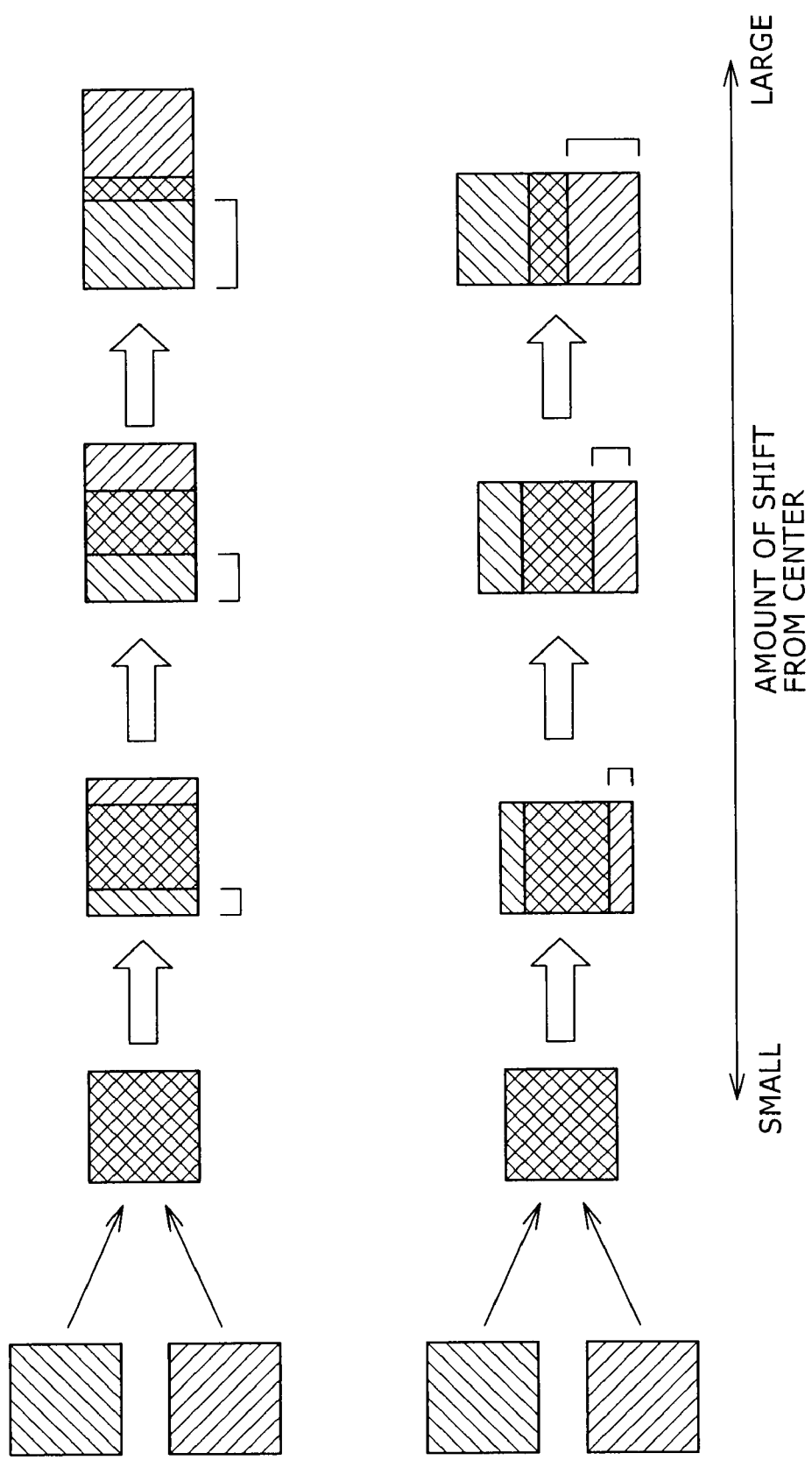
FIG. 3 is a diagram of assistance in explaining autocorrelation values.

In addition, for example, as shown in FIG. 3, it is possible to calculate an autocorrelation value Corr(0) when a reference block composed of M pixels in the horizontal direction and N pixels in the vertical direction with the pixel of interest (x, y) as a center is superimposed and an autocorrelation value Corr($i_d$) when the reference block is shifted by an $i_d$ pixel in the horizontal direction or the vertical direction, and set a difference (Corr(0)−Corr($i_d$)) between the autocorrelation values Corr(0) and Corr($i_d$) as the feature quantity p(x, y).

The autocorrelation value Corr($i_d$) when the reference block composed of M pixels in the horizontal direction and N pixels in the vertical direction with the pixel of interest (x, y) as the center is shifted by an $i_d$ pixel in the horizontal direction can be expressed by the following Equation (9).

$$Corr(i_d) = \sum^{N} \sum^{M} (g(u, v) - M_1) \times (g(u + i_d, v) - M_2) / \sqrt{V_1} / \sqrt{V_2} \quad (9)$$

In Equation (9), g(u, v) represents the pixel value of each pixel within the reference block. $M_1$ is expressed by Equation (10), and represents an average value of the pixel values within the reference block. In addition, g(u+$i_d$, v) represents the pixel value of each pixel within the block obtained by shifting the reference block by an $i_d$ pixel in the x-direction. $M_2$ is expressed by Equation (11), and represents an average value of the pixel values within the block.

$$M_1 = \sum^{N} \sum^{M} g(u, v) / N / M \quad (10)$$

-continued $$M_2 = \sum^N \sum^M g(u+i_d, v)/N/M \qquad (11)$$

$V_1$ and $V_2$ are values expressed by Equation (12) and Equation (13), respectively.

$$V_1 = \sum^N \sum^M (g(u, v) - M_1)^2 \qquad (12)$$

$$V_2 = \sum^N \sum^M (g(u+i_d, v) - M_2)^2 \qquad (13)$$

The autocorrelation value $Corr(i_d)$ when the reference block with the pixel of interest (x, y) as the center is shifted by an $i_d$ pixel in the vertical direction can be expressed by the following Equation (14).

$$Corr(i_d) = \sum^N \sum^M (g(u, v) - M_1) \times (g(u, v+i_d) - M_2) / \sqrt{V_1} / \sqrt{V_2} \qquad (14)$$

$M_1$, $M_2$, $V_1$, and $V_2$ at this time are obtained by Equations (15), (16), (17), and (18), respectively.

$$M_1 = \sum^N \sum^M g(u, v)/N/M \qquad (15)$$

$$M_2 = \sum^N \sum^M g(u, v+i_d)/N/M \qquad (16)$$

$$V_1 = \sum^N \sum^M (g(u, v) - M_1)^2 \qquad (17)$$

$$V_2 = \sum^N \sum^M (g(u, v+i_d) - M_2)^2 \qquad (18)$$

Returning to FIG. 1, the coefficient generating section 16 generates a processing coefficient vector W having the processing coefficients corresponding to each prediction tap as components. The coefficient generating section 16 then supplies the processing coefficient vector W to the product sum operation section 13. That is, the coefficient generating section 16 generates the processing coefficient vector W in Equation (2). More specifically, the coefficient generating section 16 generates the processing coefficient vector W by Equation (19) in which a feature quantity vector p having a feature quantity in each prediction tap (pixels) as a component and a coefficient vector W for operation are expanded to a kth degree.

$$W = \sum_{r=0}^{k} p^r \cdot W_r \qquad (19)$$

Incidentally, Equation (19) can be written as Equation (20) when a coefficient vector $W_0$ as an initial value is separated.

$$W = W_o + \sum_{r=1}^{k} p^r \cdot W_r \qquad (20)$$

Directing attention to a prediction tap (i, j), which is one of prediction taps of the processing coefficient vector W in Equation (19), the processing coefficient W(i, j) of the prediction tap (i, j) can be expressed by Equation (21).

$$\begin{aligned} W(i, j) &= \sum_{r=0}^{k} p^r(x, y) \cdot W_k(i, j) \\ &= W_o(i, j) + p(x, y) \cdot W_1(i, j) + p(x, y)^2 \cdot \\ & \quad W_2(i, j) + \ldots + p(x, y)^k \cdot W_k(i, j) \end{aligned} \qquad (21)$$

Hence, the coefficient generating section 16 obtains k coefficients for operation $W_0(i, j)$, $W_1(i, j)$, ..., and $W_k(i, j)$ of the prediction tap (i, j) from the coefficient ROM 17, and obtains the processing coefficient W(i, j) of the prediction tap (i, j) by performing the product sum operation of Equation (21) using the feature quantity p(x, y) supplied from the feature quantity calculating section 15. Then, after obtaining processing coefficients for all prediction taps, the coefficient generating section 16 supplies the processing coefficient vector W of the pixel of interest (x, y) to the product sum operation section 13.

The coefficient ROM 17 stores the k coefficients for operation $W_0$ to $W_k$ supplied to the coefficient generating section 16. As for the prediction tap (i, j), the coefficient ROM 17 stores the k coefficients for operation $W_0(i, j)$, $W_1(i, j)$, ..., and $W_k(i, j)$. The coefficients for operation $W_0$ to $W_k$ stored in the coefficient ROM 17 are obtained by a learning device 51 to be described later with reference to FIG. 5.

Figure 4:
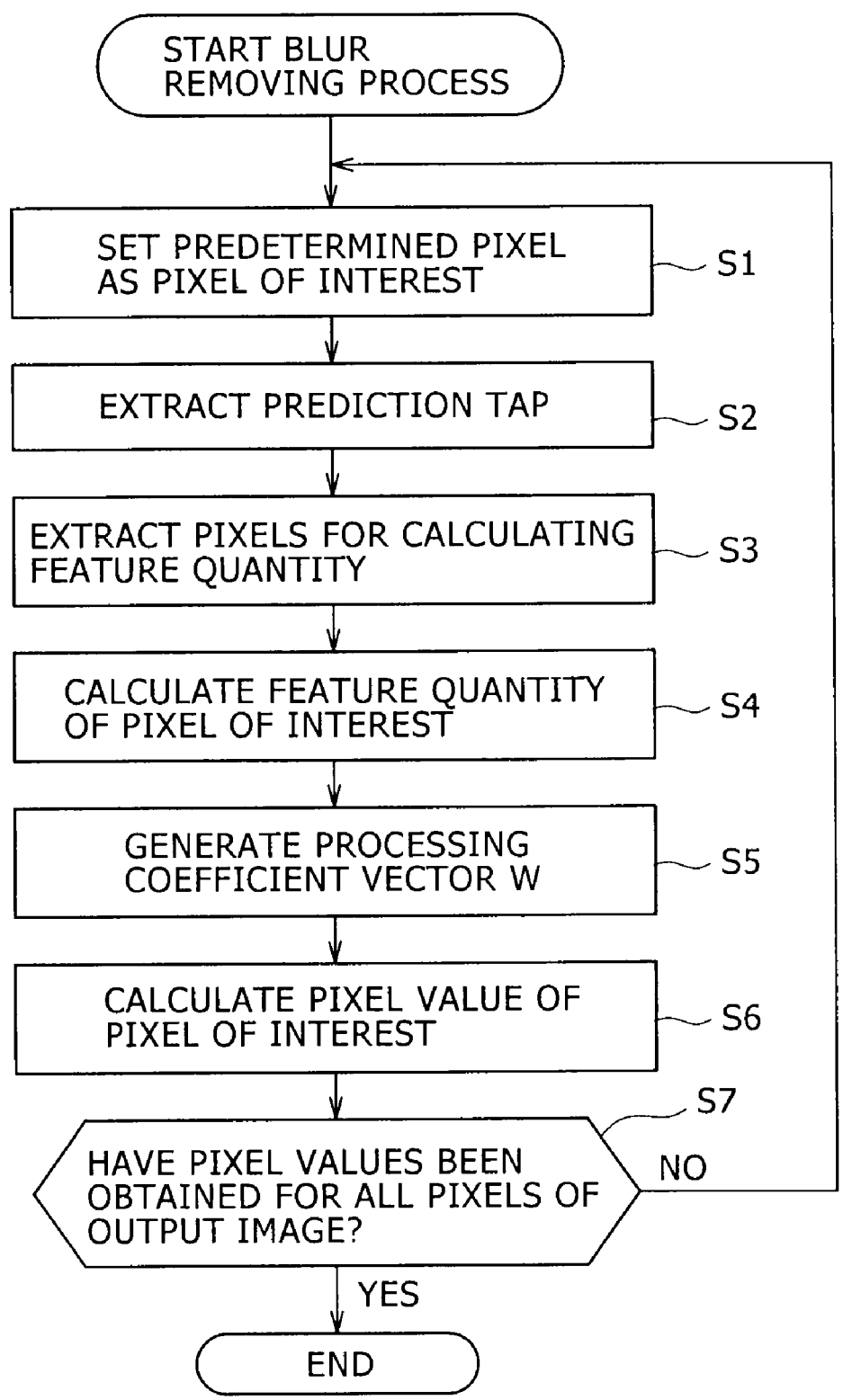
FIG. 4 is a flowchart of assistance in explaining a blur removing process by the image processing device of FIG. 1.

A blur removing process by the image processing device 1 of FIG. 1 will next be described with reference to a flowchart of FIG. 4.

In first step S1, the pixel of interest setting section 11 sets a predetermined pixel of an output image as a pixel of interest.

In step S2, the prediction pixel extracting section 12 extracts a prediction tap. For example, pixels within a circular region of an input image as shown in FIG. 2 are extracted as a prediction tap.

In step S3, the feature quantity calculating pixel extracting section 14 extracts pixels for calculating the feature quantity of the pixel of interest from the input image. The feature quantity calculating pixel extracting section 14 then supplies the pixels to the feature quantity calculating section 15.

In step S4, the feature quantity calculating section 15 calculates the feature quantity of the pixel of interest using the pixels (pixel values of the pixels) supplied from the feature quantity calculating pixel extracting section 14. The calculated feature quantity is supplied to the coefficient generating section 16.

In step S5, the coefficient generating section 16 generates a processing coefficient vector W. The coefficient generating section 16 then supplies the processing coefficient vector W to the product sum operation section 13. For example, for the prediction tap (i, j), the coefficient generating section 16 can obtain k coefficients for operation $W_0(i, j)$, $W_1(i, j)$, ..., and $W_k(i, j)$ from the coefficient ROM 17, and obtain the processing coefficient W(i, j) by performing the product sum operation of Equation (21).

In step S6, the product sum operation section 13 calculates the pixel value of the pixel of interest by Equation (2). The product sum operation section 13 then outputs the pixel value of the pixel of interest. Specifically, the product sum operation section 13 obtains the pixel value of the pixel of interest by product sum operation on the pixel values of the prediction tap supplied from the prediction pixel extracting section 12 and the processing coefficients corresponding to the prediction tap which processing coefficients are supplied from the coefficient generating section 16. The product sum operation section 13 then outputs the pixel value of the pixel of interest.

In step S7, the pixel of interest setting section 11 determines whether pixel values have been obtained for all pixels of the output image. When it is determined in step S7 that output pixel values have not been obtained for all the pixels of the output image, the process returns to step S1 to perform the process from step S1 on down again. That is, a pixel of the output image the pixel value of which pixel has not yet been obtained is set as a pixel of interest, and the pixel value is obtained.

When it is determined in step S7 that pixel values have been obtained for all the pixels of the output image, on the other hand, the process is ended.

As described above, the image processing device 1 calculates an amount of blurring of each pixel of the input image as a feature quantity, and calculates optimum processing coefficients by product sum operation on the feature quantity and coefficients for operation. The image processing device 1 thus removes a blur by performing an optimum process according to the feature quantity. Thereby, even when a plurality of subjects whose focal lengths differ from each other are included in an image, the image in focus on an entire screen can be output.

Description will next be made of learning for obtaining coefficients for operation which coefficients are stored in the coefficient ROM 17 of the image processing device 1.

Figure 5:
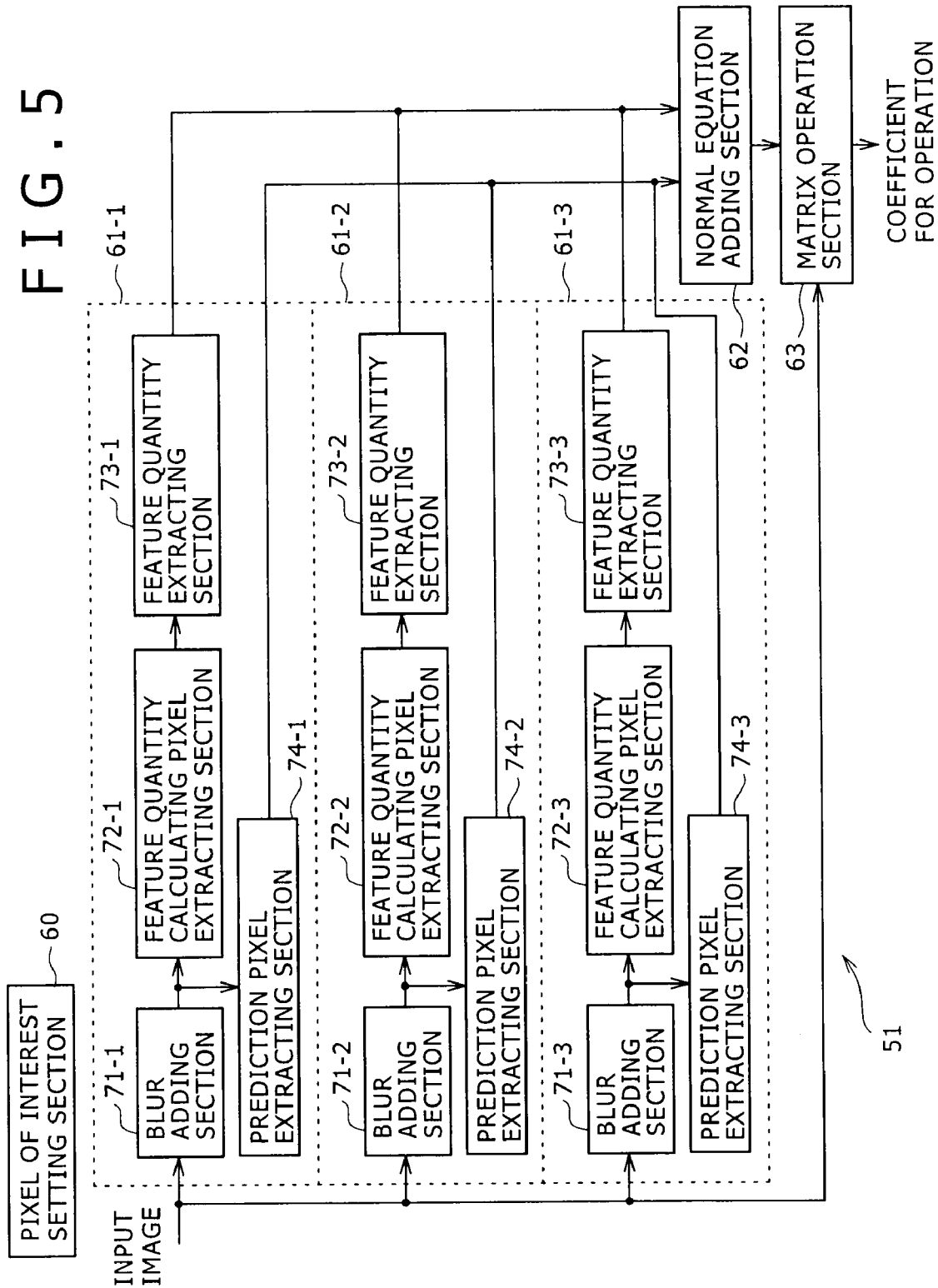
FIG. 5 is a block diagram showing an example of configuration of an embodiment of a learning device to which an embodiment of the present invention is applied.

FIG. 5 is a block diagram showing an example of configuration of a learning device for obtaining coefficients for operation which coefficients are stored in the coefficient ROM 17 in FIG. 1.

The learning device 51 of FIG. 5 includes a pixel of interest setting section 60, blurred image generating sections 61-1 to 61-3 for generating three kinds of blurred images with different amounts of blurring, a normal equation adding section 62, and a matrix operation section 63.

An image without a blur is input as a teacher image to the learning device 51. The pixel of interest setting section 60 sets a predetermined pixel of the input image input as teacher image as a pixel of interest.

The blurred image generating section 61-1 includes a blur adding section 71-1, a feature quantity calculating pixel extracting section 72-1, a feature quantity extracting section 73-1, and a prediction pixel extracting section 74-1.

The blur adding section 71-1 generates a blurred image by adding a pseudo blur to the input image. The blur adding section 71-1 then supplies the blurred image to the feature quantity calculating pixel extracting section 72-1 and the prediction pixel extracting section 74-1. Specifically, the blur adding section 71-1 generates a blurred image for the pixel of interest (x, y) according to the following Equation (22).

$$z_g(x,y) = \Sigma W_g(i_d,j_d) \times X_{in}(x+i_d, y+j_d) \quad (22)$$

$X_{in}(x+i_d, y+j_d)$ in Equation (22) denotes a pixel value at coordinates $(x+i_d, y+j_d)$ of the unblurred input image (teacher image). A value obtained by multiplying the pixel value by a weighting coefficient $W_g(i_d, i_d)$ is convoluted, whereby the pixel value $z_g(x, y)$ of a pixel (x, y) of a blurred student image is generated. In this case, for example, a Gaussian function expressing a blur caused by the defocusing of a lens as shown in the following equation is adopted as the weighting coefficient $W_g(i_d, i_d)$.

$$W_g(i_d, j_d) = \frac{1}{2\pi\sigma^2} \cdot e^{\frac{i_d^2+j_d^2}{-2\sigma^2}} \quad (23)$$

Figure 6:
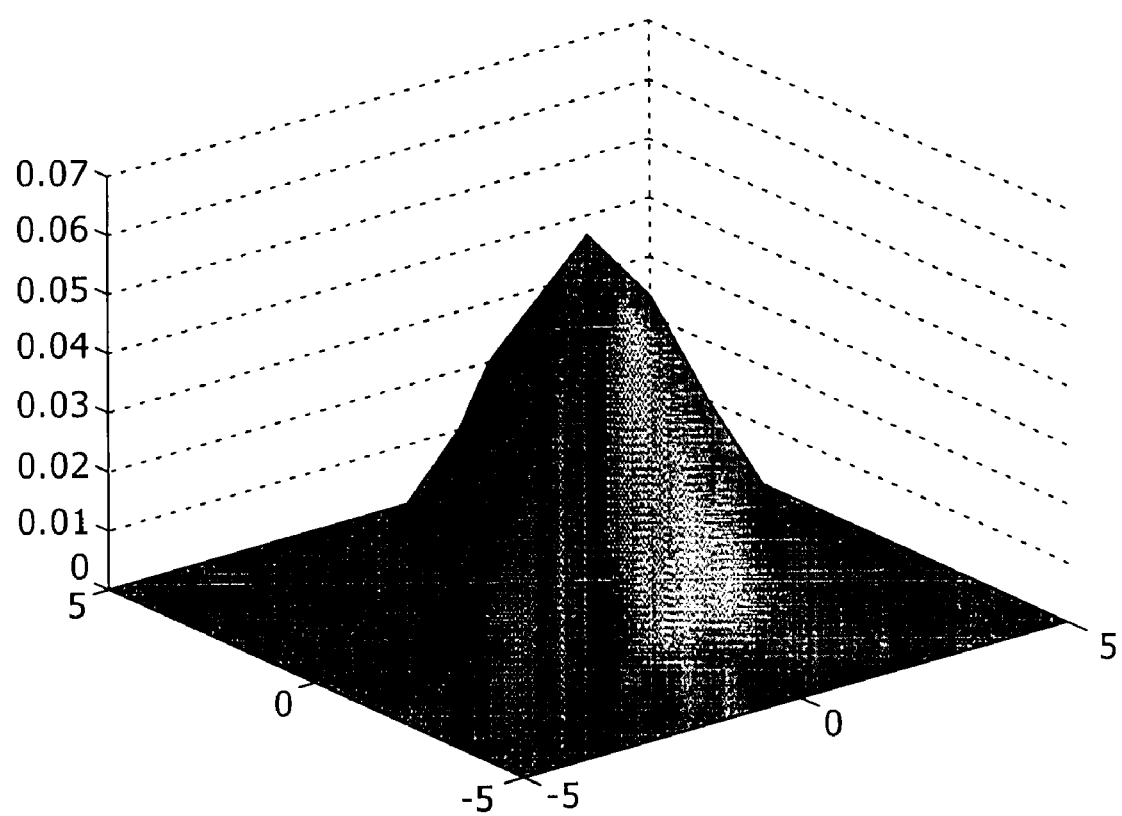
FIG. 6 is a diagram showing an example of a blur model.

FIG. 6 shows an example of a degradation model expressed by Equation (23). As the value of a parameter σ corresponding to a blur becomes larger, the blur also becomes large. Conversely, as the value of the parameter a becomes smaller, the blur also becomes small.

According to Equation (22) and Equation (23), the pixel value diffused into the pixel of interest at the position indicated by x as an x coordinate and y as a y coordinate from the pixel at the position indicated by $x+i_d$ as an x coordinate and $y+i_d$ as a y coordinate is added up. Thereby the pixel value after a blur is added to the pixel corresponding to the pixel of interest is obtained.

As with the feature quantity calculating pixel extracting section 14 in FIG. 1, the feature quantity calculating pixel extracting section 72-1 extracts pixels for calculating a feature quantity from the blurred image (student image). The feature quantity calculating pixel extracting section 72-1 then supplies the pixels to the feature quantity extracting section 73-1.

As with the feature quantity calculating section 15 in FIG. 1, the feature quantity extracting section 73-1 calculates the feature quantity of the pixel of interest using the pixels (pixel values of the pixels) supplied from the feature quantity calculating pixel extracting section 72-1. The feature quantity adopted in this case is the same as that of the feature quantity calculating section 15.

As with the prediction pixel extracting section 12 in FIG. 1, the prediction pixel extracting section 74-1 extracts pixels (pixel values of the pixels) within a predetermined region of the blurred image as a prediction tap in correspondence with the pixel of interest.

The feature quantity of the pixel of interest which feature quantity is extracted by the feature quantity extracting section 73-1 and the prediction tap extracted by the prediction pixel extracting section 74-1 are supplied to the normal equation adding section 62.

The blurred image generating section 61-2 includes a blur adding section 71-2, a feature quantity calculating pixel extracting section 72-2, a feature quantity extracting section 73-2, and a prediction pixel extracting section 74-2. The blurred image generating section 61-3 includes a blur adding section 71-3, a feature quantity calculating pixel extracting section 72-3, a feature quantity extracting section 73-3, and a prediction pixel extracting section 74-3.

Description of each part within the blurred image generating sections 61-2 and 61-3 will be omitted because each part within the blurred image generating sections 61-2 and 61-3 is the same as each part within the blurred image generating section 61-1 except that the amounts of blurring of blurred images generated by the blur adding sections 71-2 and 71-3 are different from that of the blurred image generated by the blur adding section 71-1.

Incidentally, in the present embodiment, the blurred image generating sections 61-1 to 61-3 are provided to generate three kinds of blurred images with different amounts of blurring, and supply the feature quantities and prediction taps (pixel values of the prediction taps) of the blurred images to the normal equation adding section 62. Of course, a number of kinds of blurred images with different amounts of blurring which number is other than three may be generated, and the feature quantities and prediction taps (pixel values of the prediction taps) of the blurred images may be supplied to the normal equation adding section 62. The larger the number of kinds becomes, the more various the amounts of blurring that can be handled.

The normal equation adding section 62 sets up a normal equation using the input image as teacher image and the respective blurred images and the feature quantities of the blurred images supplied from the blurred image generating sections 61-1 to 61-3.

Supposing that in order to obtain coefficient vectors for operation $W_0$ to $W_k$, a method of least squares, for example, is adopted as a standard indicating that the coefficient vectors for operation $W_0$ to $W_k$ are optimum vectors, the optimum coefficient vectors for operation $W_0$ to $W_k$ can be obtained by determining the coefficient vectors for operation $W_0$ to $W_k$ that minimize a function Q expressed by Equation (24).

$$Q = \sum_{m=1}^{N} \{z_m - W \cdot X_m^T\}^2 \qquad (24)$$

$$= \sum_{m=1}^{N} \left\{z_m - \left[W_o + \sum_{r=1}^{k} p^r \cdot W_r\right] \cdot X_m^T\right\}^2$$

In Equation (24), N is the number of samples used for learning, and T is a transpose of a matrix (vector). $X_m = \{x_{m1}, x_{m2}, \ldots, x_{mN}\}$ in Equation (24) is the pixel values of a prediction tap of the student image (blurred image), and $z_m$ is the pixel value of the teacher image (input image) at that time.

Figure 7:
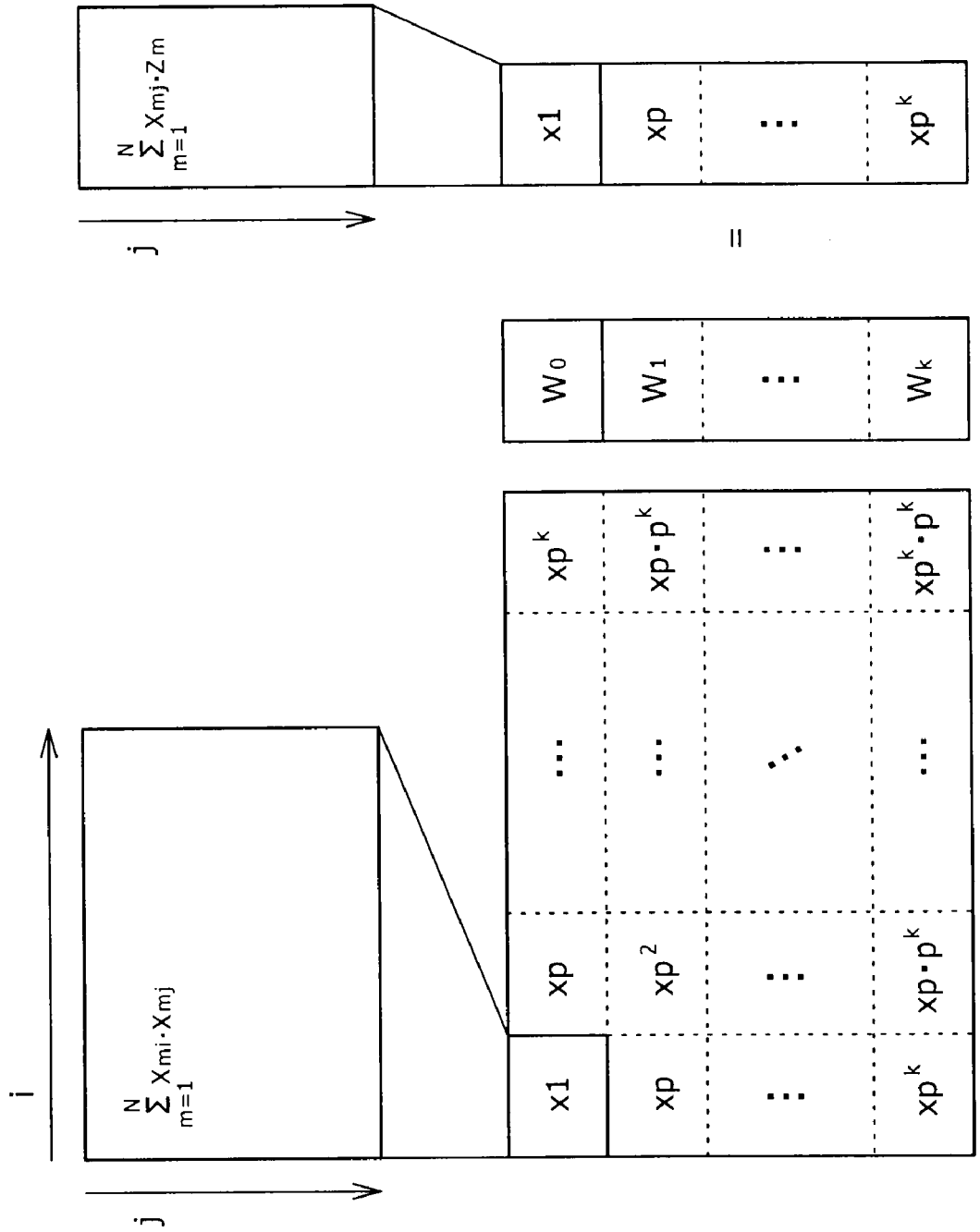
FIG. 7 is a diagram of assistance in explaining an adding matrix.

In Equation (24), a partial differential is obtained for all variables, and an adding matrix is constructed such that the value is zero as in FIG. 7.

The normal equation adding section 62 calculates the adding matrix of FIG. 7 using the input image as a teacher image and the respective blurred images and the feature quantities of the blurred images supplied from the blurred image generating sections 61-1 and 61-3. The normal equation adding section 62 thereby completes a normal equation.

The matrix operation section 63 obtains the coefficient vectors for operation $W_0$ to $W_k$ by solving the normal equation completed by the normal equation adding section 62.

Figure 8:
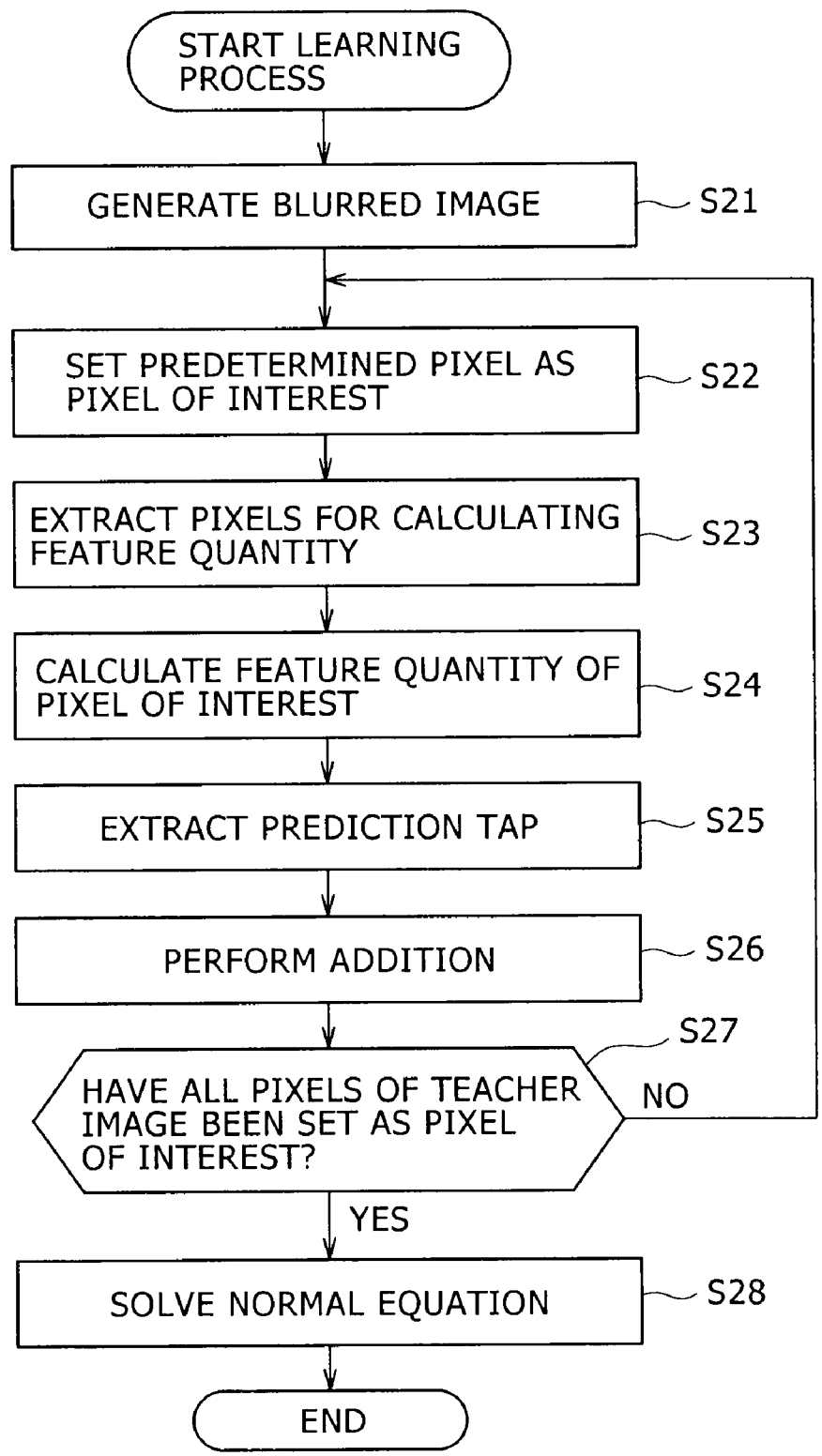
FIG. 8 is a flowchart of assistance in explaining a learning process.

FIG. 8 is a flowchart of a learning process by the learning device 51.

In first step S21, the blur adding section 71-1 of the blurred image generating section 61-1 generates a blurred image as a student image obtained by adding a predetermined amount of blurring to an input image. The blur adding sections 71-2 and 71-3 similarly generate a blurred image from the input image. Incidentally, the amounts of blurring of the blurred images generated by the blur adding sections 71-1 to 71-3 are different from each other.

In step S22, the pixel of interest setting section 60 sets a predetermined pixel of the teacher image (input image) as a pixel of interest.

In step S23, the feature quantity calculating pixel extracting section 72-1 extracts pixels for calculating a feature quantity from the blurred image (student image). The feature quantity calculating pixel extracting section 72-1 then supplies the pixels to the feature quantity extracting section 73-1. The feature quantity calculating pixel extracting sections 72-2 and 72-3 similarly extract pixels for calculating a feature quantity from the blurred images (student images).

In step S24, the feature quantity extracting section 73-1 calculates the feature quantity of the pixel of interest using the pixels (pixel values of the pixels) supplied from the feature quantity calculating pixel extracting section 72-1. The feature quantity extracting sections 73-2 and 73-3 similarly calculate the feature quantity of the pixel of interest.

In step S25, the prediction pixel extracting section 74-1 extracts a prediction tap from the blurred image supplied from the blur adding section 71-1. The prediction pixel extracting sections 74-2 and 74-3 similarly extract a prediction tap from the blurred images supplied from the blur adding sections 71-2 and 71-3, respectively.

In step S26, the normal equation adding section 62 performs addition. Specifically, the normal equation adding section 62 adds the pixel values of the prediction taps in the respective blurred images and the pixel value and the feature quantities of the pixel of interest, which are supplied from the blurred image generating sections 61-1 to 61-3, to the adding matrix of FIG. 7.

In step S27, the pixel of interest setting section 60 determines whether all pixels of the teacher image have been set as pixel of interest. When it is determined in step S27 that not all the pixels of the teacher image have yet been set as pixel of interest, the process returns to step S22 to repeat the process from step S22 on down.

When it is determined in step S27 that all the pixels of the teacher image have been set as pixel of interest, the process proceeds to step S28. Incidentally, while steps S21 to S27 have been described as a process for one teacher image, the process actually proceeds to step S28 after completing the process of steps S21 to S27 on all teacher images equivalent to the number of samples used for learning.

In step S28, the matrix operation section 63 obtains the coefficient vectors for operation $W_0$ to $W_k$ by solving the normal equation completed by the normal equation adding section 62. Then the process is ended.

As described above, the learning process by the learning device 51 obtains a processing coefficient vector W (second processing coefficient) by operation on feature quantity vectors p obtained from a plurality of kinds of blurred images as student images formed by adding blurs with a plurality of kinds of amounts of blurring to an input image and coefficient vectors for operation $W_0$ to $W_k$ (first processing coefficient), and generates a normal equation using the pixel values of the blurred images as student images and the pixel values of the input image as teacher image to solve a relational equation for generating the input image as teacher image to which no blur is added by operation on the processing coefficient vector W and the student images. The coefficient vectors for operation $W_0$ to $W_k$ are generated by solving the normal equation. The obtained coefficient vectors for operation $W_0$ to $W_k$ are stored in the coefficient ROM 17 of the image processing device 1.

Description will next be made of other embodiments of the image processing device.

Figure 9:
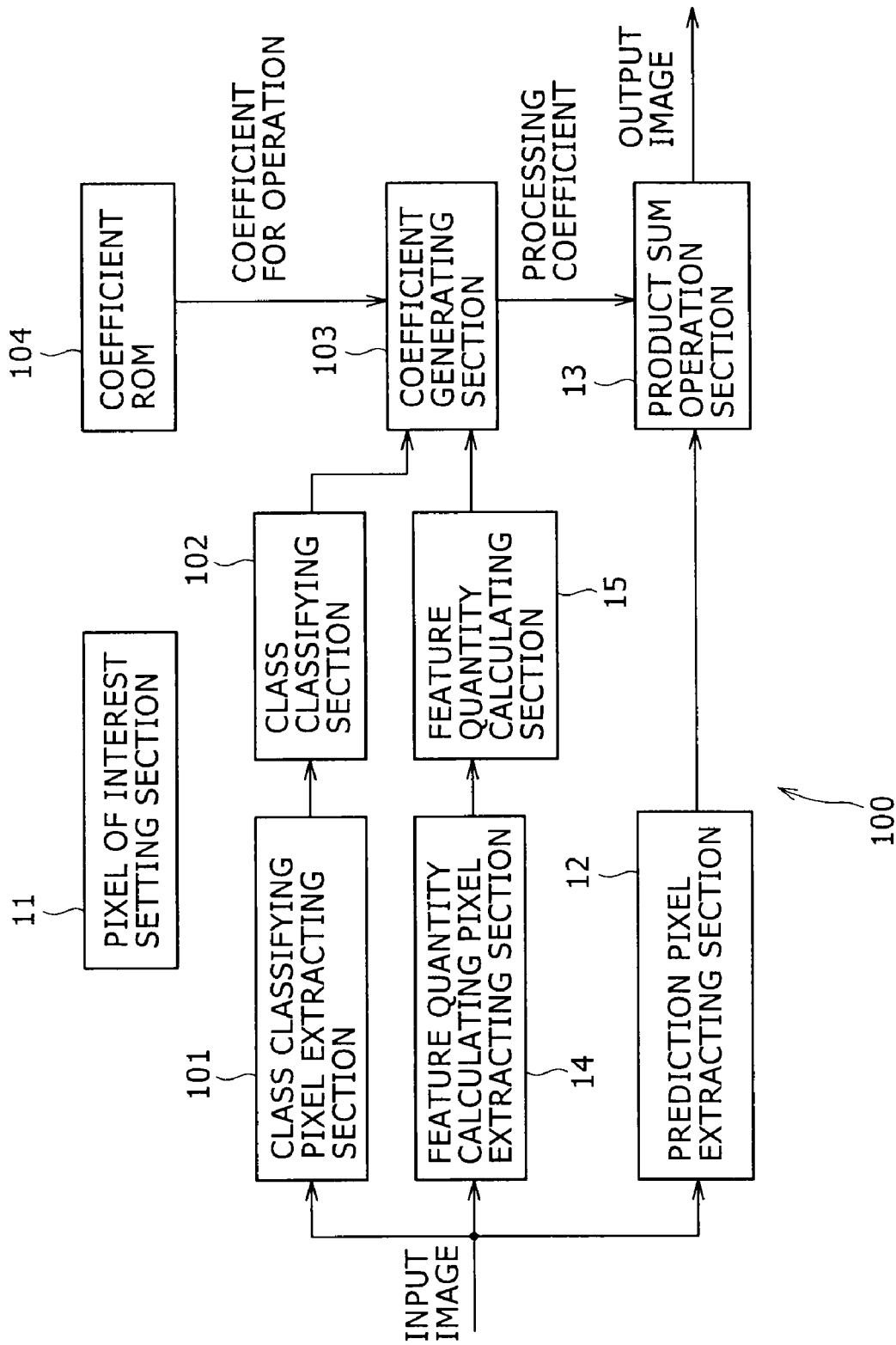
FIG. 9 is a block diagram showing an example of configuration of a second embodiment of an image processing device to which an embodiment of the present invention is applied.

FIG. 9 is a block diagram showing an example of configuration of a second embodiment of the image processing device to which an embodiment of the present invention is applied.

In FIG. 9, parts corresponding to those of the image processing device 1 of FIG. 1 are identified by the same reference numerals, and description thereof will be omitted as appropriate.

The image processing device 100 is newly provided with a class classifying pixel extracting section 101 and a class classifying section 102, and is further provided with a coefficient generating section 103 and a coefficient ROM 104 in place of the coefficient generating section 16 and the coefficient ROM 17.

The class classifying pixel extracting section 101 extracts some pixels of an input image as pixels to be used for class classification that classifies a pixel of interest into one of several classes. The pixels extracted by the class classifying pixel extracting section 101 will be referred to as a class tap. The class tap may be the same as the prediction tap extracted by the prediction pixel extracting section 12, or may be different from the prediction tap.

The class classifying section 102 classifies the pixel of interest into a class on the basis of the class tap from the class classifying pixel extracting section 101, and supplies a class code corresponding to the class obtained as a result of the class classification to the coefficient generating section 103.

In this case, ADRC (Adaptive Dynamic Range Coding), for example, can be adopted as a method for performing the class classification.

A method using ADRC subjects the pixels (pixel values of the pixels) forming the class tap to ADRC processing, and determines the class of the pixel of interest according to an ADRC code obtained as a result of the ADRC processing.

Incidentally, in K-bit ADRC, for example, a maximum value MAX and a minimum value MIN of pixel values of the pixels forming the class tap are detected, DR=MAX−MIN is set as a local dynamic range of the set, and the pixel value of each pixel forming the class tap is requantized into K bits on the basis of the dynamic range DR. That is, the minimum value MIN is subtracted from the pixel value of each pixel forming the class tap, and the subtraction value is divided (requantized) by $DR/2^K$. Then, a bit string obtained by arranging the K-bit pixel values of the pixels forming the class tap which pixel values are obtained as described above in predetermined order is output as an ADRC code. Thus, when the class tap is subjected to one-bit ADRC processing, for example, the pixel value of each pixel forming the class tap is divided by an average value of the maximum value MAX and the minimum value MIN (a fractional part is dropped), and thereby the pixel value of each pixel is converted into one bit (binarized). Then, a bit string obtained by arranging the one-bit pixel values in predetermined order is output as an ADRC code.

Incidentally, the class classifying section 102 can, for example, output a pattern of level distribution of the pixel values of the pixels forming the class tap as a class code as it is. However, in this case, when the class tap is formed by the pixel values of N pixels and K bits are assigned to the pixel value of each pixel, the number of patterns in the case of the class code output by the class classifying section 102 is $(2^N)^K$, which is an enormous number that is exponentially proportional to the number K of bits of the pixel values of the pixels. It is therefore desirable that the class classifying section 102 perform class classification by compressing the amount of information of the class tap by the above-described ADRC processing, vector quantization or the like.

The coefficient ROM 104 stores coefficient vectors for operation $W_0$ to $W_k$ for each class. The coefficient generating section 103 obtains coefficient vectors for operation $W_0$ to $W_k$ for the class supplied from the class classifying section 102 from the coefficient ROM 104, obtains a processing coefficient vector W according to Equation (19), and then supplies the processing coefficient vector W to a product sum operation section 13.

A learning device that learns the coefficient vectors for operation stored in the coefficient ROM 104 is similar to the learning device 51 of FIG. 5 except that the learning device which learns the coefficient vectors for operation stored in the coefficient ROM 104 is provided with a class classifying pixel extracting section and a class classifying section similar to the class classifying pixel extracting section 101 and the class classifying section 102, classifies an input image (teacher image) into a class, and obtains the coefficient vectors for operation for each class.

Figure 10:
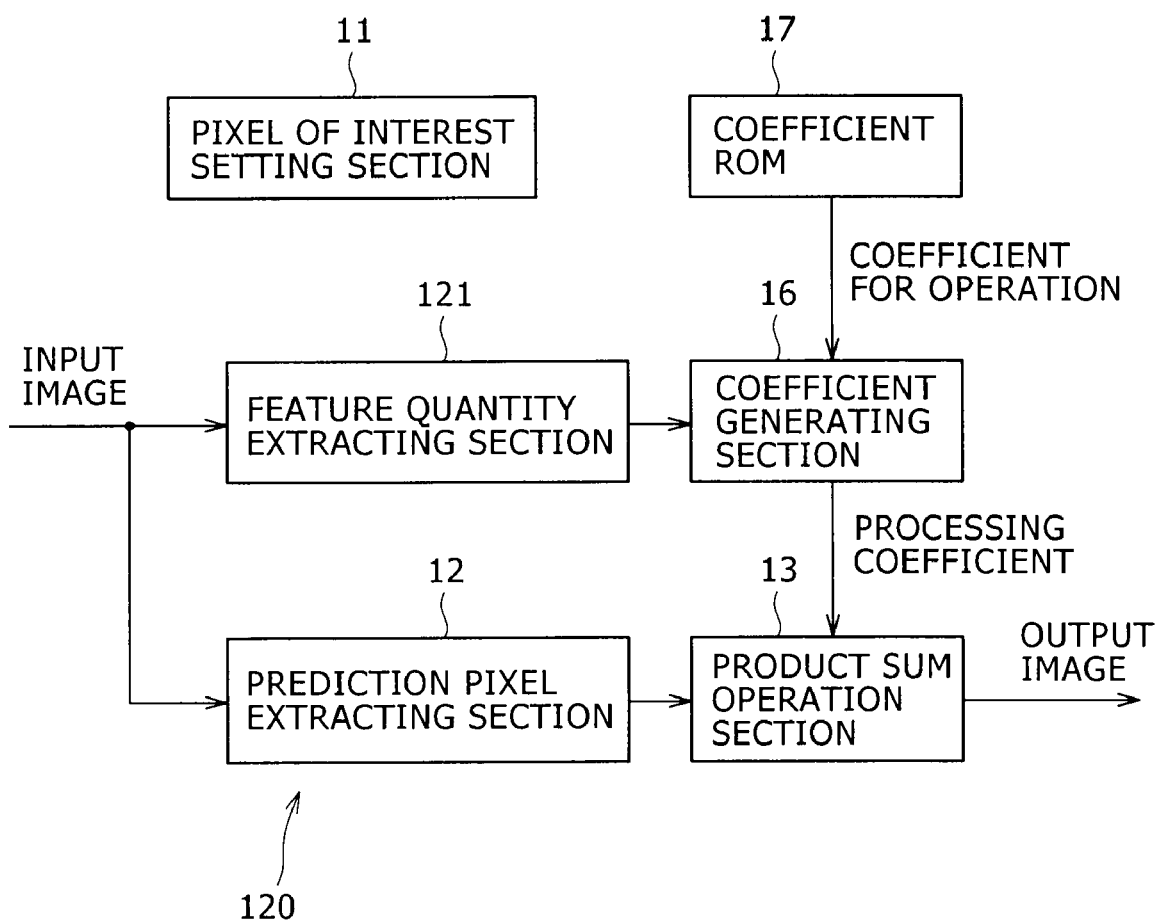
FIG. 10 is a block diagram showing an example of configuration of a third embodiment of an image processing device to which an embodiment of the present invention is applied.

FIG. 10 is a block diagram showing an example of configuration of a third embodiment of the image processing device to which an embodiment of the present invention is applied.

In FIG. 10, parts corresponding to those of the image processing device 1 of FIG. 1 are identified by the same reference numerals, and description thereof will be omitted as appropriate.

The image processing device 120 of FIG. 10 is provided with a feature quantity extracting section 121 in place of the feature quantity calculating pixel extracting section 14 and the feature quantity calculating section 15 in FIG. 1.

FIG. 11 is a block diagram showing an example of detailed configuration of the feature quantity extracting section 121.

The feature quantity extracting section 121 includes blur removing process sections 140a to 140f, feature quantity calculating sections 141a to 141f, degenerating sections 142a to 142f, a connecting section 143, a probability distribution DB (Data Base) 144, and an amount of blurring determining section 145.

The blur removing process sections 140a to 140f subject an input image to a blur removing process to generate a blur removal result image. The amounts of blurring of the image which blurring is removed by the blur removing process sections 140a to 140f are different from each other. For example, the amount of removed blurring is increased in order of the blur removing process sections 140a to 140f. The blur removing process sections 140a to 140f obtain the pixel value of a pixel of interest after blur removal (that is, the pixel value of the blur removal result image) by product sum operation on the pixel values of pixels in a predetermined range of the input image which range is determined with the pixel of interest as a reference and a blur removal coefficient corresponding to the pixel values of the pixels in the predetermined range and obtained by learning in advance.

The feature quantity calculating sections 141a to 141f each calculate the feature quantity of each pixel within the predetermined region of the input image which region is set in correspondence with the pixel of interest, and then supply the feature quantity to the degenerating sections 142a to 142f. For example, the feature quantity calculating sections 141a to 141f calculate one of the differential system feature quantities expressed by Equations (3) to (8) described above, and then supply the feature quantity to the degenerating sections 142a to 142f.

The degenerating sections 142a to 142f respectively subject the feature quantities supplied from the feature quantity calculating sections 141a to 141f to a bit degenerating process. For example, when the feature quantities supplied from the feature quantity calculating sections 141a to 141f are each 8 bits, the degenerating sections 142a to 142f deletes 3 bits as LSBs (Least Significant Bits), thereby degenerate the feature quantities into 5 bits, and then output the feature quantities of 5 bits. Incidentally, an amount of degeneration in the degenerating sections 142a to 142f is determined in advance by an experiment or the like so that the number of classifications of a feature quantity code supplied by the connecting section 143 to the amount of blurring determining section 145 is an appropriate number.

The connecting section 143 supplies the amount of blurring determining section 145 with the feature quantity code obtained by connecting the feature quantities supplied from the degenerating sections 142a to 142f to each other in predetermined order.

The probability distribution DB 144 stores the probability of each blur parameter σ for each feature quantity code on the basis of information generated by a DB generating device not shown in the figure.

The DB generating device determines feature quantity codes for blurred images with various amounts of blurring, which blurred images are generated by setting the blur parameter σ in Equation (23) to various values, by a configuration similar to that of the blur removing process sections 140a to 140f, the feature quantity calculating sections 141a to 141f, the degenerating sections 142a to 142f, and the connecting section 143. The DB generating device accumulates information on the determined feature quantity codes together with information on the blur parameter σ. Thereby, together with the frequency of each feature quantity code (total number of occurrences of the feature quantity code), information on the frequency (number of occurrences) of each blur parameter σ in each of the feature quantity codes is accumulated. The probability distribution DB 144 stores the probability of each blur parameter σ as a value obtained by dividing the frequency (number of occurrences) of each blur parameter by the frequency of the feature quantity code (total number of occurrences of the feature quantity code) for all feature quantity codes on the basis of the information thus accumulated in the DB generating device.

The amount of blurring determining section 145 refers to the probability distribution DB 144, and then outputs an amount of blurring corresponding to the feature quantity code supplied from the connecting section 143 as a feature quantity. More specifically, the amount of blurring determining section 145 identifies the probability of each blur parameter σ for the same feature quantity code as the feature quantity code supplied from the connecting section 143 in the probability distribution DB 144, and then outputs the blur parameter a having the highest probability among the identified probabilities of the blur parameters σ as the feature quantity p(x, y) of the pixel of interest (x, y).

As described above, the feature quantity supplied to the coefficient generating section 16 can be not only a linear feature quantity such as the differential system feature quantities expressed by Equations (3) to (8) used in the first and second embodiments but also a nonlinear feature quantity that cannot be obtained by a linear sum as in the third embodiment.

A learning device that learns coefficient vectors for operation stored in the coefficient ROM 17 of the image processing device 120 of FIG. 10 is similar to the learning device 51 of FIG. 5 except that the calculation of the feature quantity is changed to a similar calculation to that of the feature quantity extracting section 121 of FIG. 11.

Incidentally, the feature quantity extracting section 121 of FIG. 11 can be further modified. For example, instead of outputting the blur parameter σ having the highest probability for only the pixel of interest as the feature quantity as described above, the blur parameter σ having the highest probability may be obtained for each of a plurality of pixels around the pixel of interest, and the blur parameter σ having a highest addition probability obtained by adding together the probabilities of the same blur parameter σ may be output as the feature quantity.

In addition, for example, it is possible to have a DB for determining noise as a measure against erroneous detection of an amount of blurring when noise is superimposed on a flat part in an image, not to use blur parameters σ judged to be blur parameters σ for noise, and then to output a blur parameter σ having a highest probability (or a highest addition probability).

The image processing devices according to embodiments of the present invention (the image processing device 1, the image processing device 100, and the image processing device 120) generate an output image using an optimum processing coefficient according to the feature quantity of each pixel, and are thus able to optimally remove a blur that occurs when a plurality of subjects whose focal lengths differ from each other are included in an image.

Because the coefficient vectors for operation $W_0$ to $W_k$ are optimized by the processing using the method of least squares of the learning device, a selection error when processing coefficients are changed for each feature quantity can be avoided, and images do not easily fail. In addition, the image processing devices according to the foregoing embodiments of the present invention can reduce an amount of retained information as compared with a case of retaining a processing coefficient vector W for each feature quantity.

Incidentally, in the above-described examples, a single kind of feature quantity is calculated. However, it is also possible to determine the coefficient vectors for operation $W_0$ to $W_k$ using two or more kinds of feature quantities.

For example, when the processing coefficient vector W is determined on the basis of two kinds of feature quantities of feature quantity vectors p and q, an equation when the processing coefficient vector W is generated which equation corresponds to the above-described Equation (19) can be expressed as Equation (25).

$$W = \sum_{r=0}^{k} \sum_{s=0}^{l} p^r \cdot q^s \cdot W_{rs} \tag{25}$$

The series of processes described above can be carried out not only by hardware but also by software. When the series of processes is to be carried out by software, a program constituting the software is installed from a program recording medium onto a computer incorporated in dedicated hardware, or a general-purpose personal computer, for example, that can perform various functions by installing various programs thereon.

FIG. 12 is a block diagram showing an example of configuration of hardware of a computer that performs the series of processes described above by program.

In the computer, a CPU (Central Processing Unit) 201, a ROM (Read Only Memory) 202, and a RAM (Random Access Memory) 203 are interconnected by a bus 204.

The bus 204 is further connected with an input-output interface 205. The input-output interface 205 is connected with an inputting section 206 formed by a keyboard, a mouse, a microphone and the like, an outputting section 207 formed by a display, a speaker and the like, a storing section 208 formed by a hard disk, a nonvolatile memory and the like, a communicating section 209 formed by a network interface and the like, and a drive 210 for driving removable media 211 such as a magnetic disk, an optical disk, a magneto-optical disk, a semiconductor memory or the like.

In the computer configured as described above, the CPU 201, for example, loads a program stored in the storing section 208 into the RAM 203 via the input-output interface 205 and the bus 204, and then executes the program, whereby the series of processes described above is performed.

The program executed by the computer (CPU 201) is, for example, provided in a state of being recorded on the removable media 211, which are packaged media formed by a magnetic disk (including flexible disks), an optical disk (CD-ROM (Compact Disk-Read Only Memory), DVD (Digital Versatile Disk) and the like), a magneto-optical disk, a semiconductor memory or the like, or via a wire or wireless transmission medium such as a local area network, the Internet, digital satellite broadcasting or the like.

Then, by mounting the removable media 211 in the drive 210, the program can be installed into the storing section 208 via the input-output interface 205. The program can also be received by the communicating section 209 via the wire or wireless transmission medium and then installed into the storing section 208. In addition, the program can be installed into the ROM 202 or the storing section 208 in advance.

Incidentally, the program executed by the computer may perform processing in time series in the order described in the present specification, or may perform processing in parallel or in necessary timing such, for example, as when a call is made.

In the present specification, the steps described in the flowcharts include not only processes carried out in time series in the described order but also processes carried out in parallel or individually and not necessarily in time series.

Embodiments of the present invention are not limited to the foregoing embodiments, and various changes can be made without departing from the spirit of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device for converting an input image into an output image whose blur is reduced, said image processing device comprising:
    a first image extracting section configured to extract a plurality of pixels composed of a pixel of said input image which corresponds to a pixel of interest within said output image and predetermined pixels surrounding the pixel of interest;
    a first feature quantity calculating section configured to calculate a first feature quantity from said plurality of pixels extracted by said first image extracting section, the first feature quantity being a difference between two autocorrelation values based on a superposition of a first block of pixels and a second block of pixels, the center of the second block of pixels being distant by a predetermined number of pixels from the center of the first block of pixels, the first block of pixels including the pixel of interest;
    a processing coefficient generating section configured to obtain a second processing coefficient based on said first feature quantity and a first processing coefficient, said second processing coefficient being generated by operation on said first feature quantity and said first processing coefficient, the first processing coefficient being learned in advance from a normal equation based on a relational equation for generating an unblurred teacher image based on the second processing coefficient and blurred images to which blurs of a plurality of kinds of amounts of blurring are added as student images;
    a second pixel extracting section configured to extract the pixel of interest and a plurality of pixels surrounding said pixel of interest from said input image;
    a predicting section configured to generate a pixel value of said pixel of interest based on said plurality of pixels extracted by said second pixel extracting means and said second processing coefficient;
    a nonlinear feature quantity determining section configured to determine a nonlinear feature quantity as said first feature quantity using a second feature quantity of each of a plurality of kinds of blur removal result images, the plurality of kinds of blur removal result images being based on said student images.

2. The image processing device according to claim 1, further comprising:
    a blur removing process section configured to generate the plurality of kinds of blur removal result images by adding blurs of a plurality of kinds of amounts of blurring to said student images and subjecting the student images to a blur removing process by a plurality of blur removal coefficients for removing the blurs of said plurality of kinds of amounts of blurring respectively; and
    a second feature quantity calculating section configured to calculate the second feature quantity from said plurality of kinds of blur removal result images.

3. The image processing device according to claim 1, further comprising:
    class classifying means for classifying said pixel of interest into a predetermined class according to pixel values of the pixel of said input image which pixel corresponds to said pixel of interest and predetermined pixels surrounding the pixel of said input image,
    wherein said coefficient generating means generates said normal equation for each class.

4. The image processing device according to claim 1, wherein the shape of the region containing the plurality of pixels extracted by the second pixel extracting section is based on an state of degradation of the input image.

5. An image processing method for converting an input image into an output image whose blur is reduced, said image processing method comprising the steps of:
    extracting a plurality of pixels composed of a pixel of said input image which corresponds to a pixel of interest within said output image and predetermined pixels surrounding the pixel of interest;
    calculating a feature quantity from said plurality of pixels extracted, the feature quantity being a difference between two autocorrelation values based on a superposition of a first block of pixels and a second block of pixels, the center of the second block of pixels being distant by a predetermined number of pixels from the center of the first block of pixels, the first block of pixels including the pixel of interest;
    obtaining a second processing coefficient based on said feature quantity and a first processing coefficient, said second processing coefficient being generated by operation on said feature quantity and said first processing coefficient, said first processing coefficient being learned in advance from a normal equation based on a relational equation for generating an unblurred teacher image based on the second processing coefficient and blurred images to which blurs of a plurality of kinds of amounts of blurring are added as student images;
    extracting the pixel of interest and a plurality of pixels surrounding the pixel of interest from said input image;

19 generating a pixel value of said pixel of interest based on said plurality of pixels further extracted and said second processing coefficient; and determining a nonlinear feature quantity as said first feature quantity using a second feature quantity of each of a plurality of kinds of blur removal result images, the plurality of kinds of blur removal result images being based on said student images.

6. A non-transitory computer readable medium having computer readable instructions thereon that when executed by a computer cause the computer to perform an image processing method for converting an input image into an output image whose blur is reduced, said image processing method comprising:

extracting a plurality of pixels composed of a pixel of said input image which corresponds to a pixel of interest within said output image and predetermined pixels surrounding the pixel of interest;

calculating a feature quantity from said plurality of pixels extracted, the feature quantity being a difference between two autocorrelation values based on a superposition of a first block of pixels and a second block of pixels, the center of the second block of pixels being distant by a predetermined number of pixels from the center of the first block of pixels, the first block of pixels including the pixel of interest;

obtaining a second processing coefficient based on said feature quantity and a first processing coefficient, said second processing coefficient being generated by operation on said feature quantity and said first processing coefficient, the first processing coefficient being learned in advance from a normal equation based on a relational equation for generating an unblurred teacher image based on the second processing coefficient and blurred images to which blurs of a plurality of kinds of amounts of blurring are added as student images;

extracting the pixel of interest and a plurality of pixels surrounding the pixel of interest from said input image;

generating a pixel value of said pixel of interest based on said plurality of pixels further extracted and said second processing coefficient; and determining a nonlinear feature quantity as said first feature quantity using a second feature quantity of each of a plurality of kinds of blur removal result images, the plurality of kinds of blur removal result images being based on said student images.

7. A learning device comprising:

a normal equation generating section configured to obtain a second processing coefficient based on a feature quantity and a first processing coefficient obtained from a plurality of kinds of blurred images as student images formed by adding blurs of a plurality of kinds of amounts of blurring to an input image, the feature quantity being a difference between two autocorrelation values based on a superposition of a first block of pixels and a second block of pixels, the center of the second block of pixels being distant by a predetermined number of pixels from the center of the first block of pixels, the first block of pixels including a pixel of interest, and generate a normal equation using pixel values of the student images and pixel values of the input image as a teacher image to solve a relational equation for generating said input image as unblurred teacher image based on the second processing coefficient and said student images;

20 a coefficient generating section configured to generate said first processing coefficient by solving said normal equation; and a nonlinear feature quantity determining section configured to determine a nonlinear feature quantity as said feature quantity using a second feature quantity of each of a plurality of kinds of blur removal result images, the plurality of kinds of blur removal result images being based on said student images.

8. The learning device according to claim 7, further comprising:

a blur removing process section configured to generate the plurality of kinds of blur removal result images by adding blurs of a plurality of kinds of amounts of blurring to said student images and subjecting the student images to a blur removing process by a plurality of blur removal coefficients for removing the blurs of said plurality of kinds of amounts of blurring respectively; and a feature quantity detecting section configured to detect the second feature quantity from said plurality of kinds of blur removal result images.

9. The learning device according to claim 7, further comprising:

class classifying means for classifying a pixel of interest into a predetermined class according to pixel values of a pixel of said student images which pixel corresponds to said pixel of interest and predetermined pixels surrounding the pixel corresponding to said pixel of interest, wherein said coefficient generating means generates said normal equation for each class.

10. An image processing device for converting an input image into an output image whose blur is reduced, said image processing device comprising:

first image extracting means for extracting a plurality of pixels composed of a pixel of said input image which corresponds to a pixel of interest within said output image and predetermined pixels surrounding the pixel of interest;

first feature quantity calculating means for calculating a first feature quantity from said plurality of pixels extracted by said first image extracting means, the first feature quantity being a difference between two autocorrelation values based on a superposition of a first block of pixels and a second block of pixels, the center of the second block of pixels being distant by a predetermined number of pixels from the center of the first block of pixels, the first block of pixels including the pixel of interest;

processing coefficient generating means for obtaining a second processing coefficient based on said first feature quantity and a first processing coefficient, said second processing coefficient being generated by operation on said first feature quantity and said first processing coefficient, the first processing coefficient being learned in advance from a normal equation based on a relational equation for generating an unblurred teacher image based on the second processing coefficient and blurred images to which blurs of a plurality of kinds of amounts of blurring are added as student images;

second pixel extracting means for extracting the pixel of interest and a plurality of pixels surrounding said pixel of interest from said input image;

predicting means for generating a pixel value of said pixel of interest based on said plurality of pixels extracted by said second pixel extracting section and said second processing coefficient; and nonlinear feature quantity determining means for determining a nonlinear feature quantity as said first feature quantity using a second feature quantity of each of a plurality of kinds of blur removal result images, the plurality of kinds of blur removal result images being based on said student images.

11. A learning device comprising:

normal equation generating means for obtaining a second processing coefficient based on a feature quantity and a first processing coefficient obtained from a plurality of kinds of blurred images as student images formed by adding blurs of a plurality of kinds of amounts of blurring to an input image, the feature quantity being a difference between two autocorrelation values based on a superposition of a first block of pixels and a second block of pixels, the center of the second block of pixels being distant by a predetermined number of pixels from the center of the first block of pixels, the first block of pixels including a pixel of interest, and generating a normal equation using pixel values of the student images and pixel values of the input image as a teacher image to solve a relational equation for generating said input image as unblurred teacher image based on the second processing coefficient and said student images;

coefficient generating means for generating said first processing coefficient by solving said normal equation; and nonlinear feature quantity determining means for determine a nonlinear feature quantity as said feature quantity using a second feature quantity of each of a plurality of kinds of blur removal result images, the plurality of kinds of blur removal result images being based on said student images.

* * * * *